(12) United States Patent
Szakurski

(10) Patent No.: US 6,719,328 B2
(45) Date of Patent: Apr. 13, 2004

(54) TRUCK SPRAY CONTROL SYSTEM

(76) Inventor: Joseph Szakurski, R.R. 2, Box 2109A, Stroudsburg, PA (US) 18360

( * ) Notice: Subject to any disclaimer, the term of this patent is extended or adjusted under 35 U.S.C. 154(b) by 0 days.

(21) Appl. No.: 09/951,591

(22) Filed: Sep. 13, 2001

(65) Prior Publication Data

US 2002/0056985 A1 May 16, 2002

Related U.S. Application Data

(63) Continuation-in-part of application No. 09/351,358, filed on Jul. 12, 1998, now abandoned.
(60) Provisional application No. 60/101,437, filed on Sep. 21, 1998.

(51) Int. Cl.[7] .............................................. B62D 25/18
(52) U.S. Cl. ..................................................... 280/848
(58) Field of Search ................................. 280/851, 852, 280/847, 152.2, 848

(56) References Cited

U.S. PATENT DOCUMENTS 3,743,343 A * 7/1973 Grote, Sr. et al. .......... 280/851
3,869,617 A * 3/1975 Gaussoin et al. ........... 280/851

* cited by examiner

*Primary Examiner*—Brian L. Johnson
*Assistant Examiner*—Jeffrey J. Restifo
(74) *Attorney, Agent, or Firm*—Charles A. Wilkinson; Clinton H. Wilkinson

(57) ABSTRACT

A road vehicle spray control system, including a combination of a louvered side panel and mudguard, for controlling the splash and spray generated by trucks, trailers and other road vehicles when travelling during inclement weather, wherein the louvered side panels are attached to the underside of the vehicle, maintaining the legal 8 foot width requirements, so that an airflow is created which forces air through the louvers and which airflow directs water or spray downward into the wheel well and towards mudguards mounted behind the rear wheels. Such mudguards have a downwardly facing opening in the center portion and are preferably curved to an angle of 27 degrees, so that rain, spray, water, small pebbles and the like are directed through such opening, to be dissipated on the roadway surface, resulting in safer driving conditions.

11 Claims, 5 Drawing Sheets

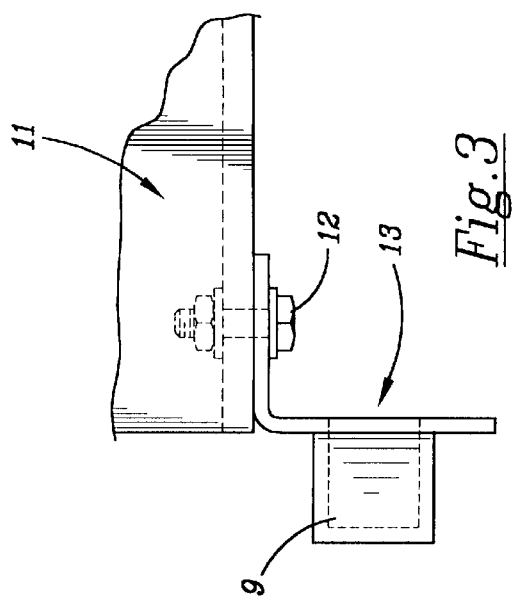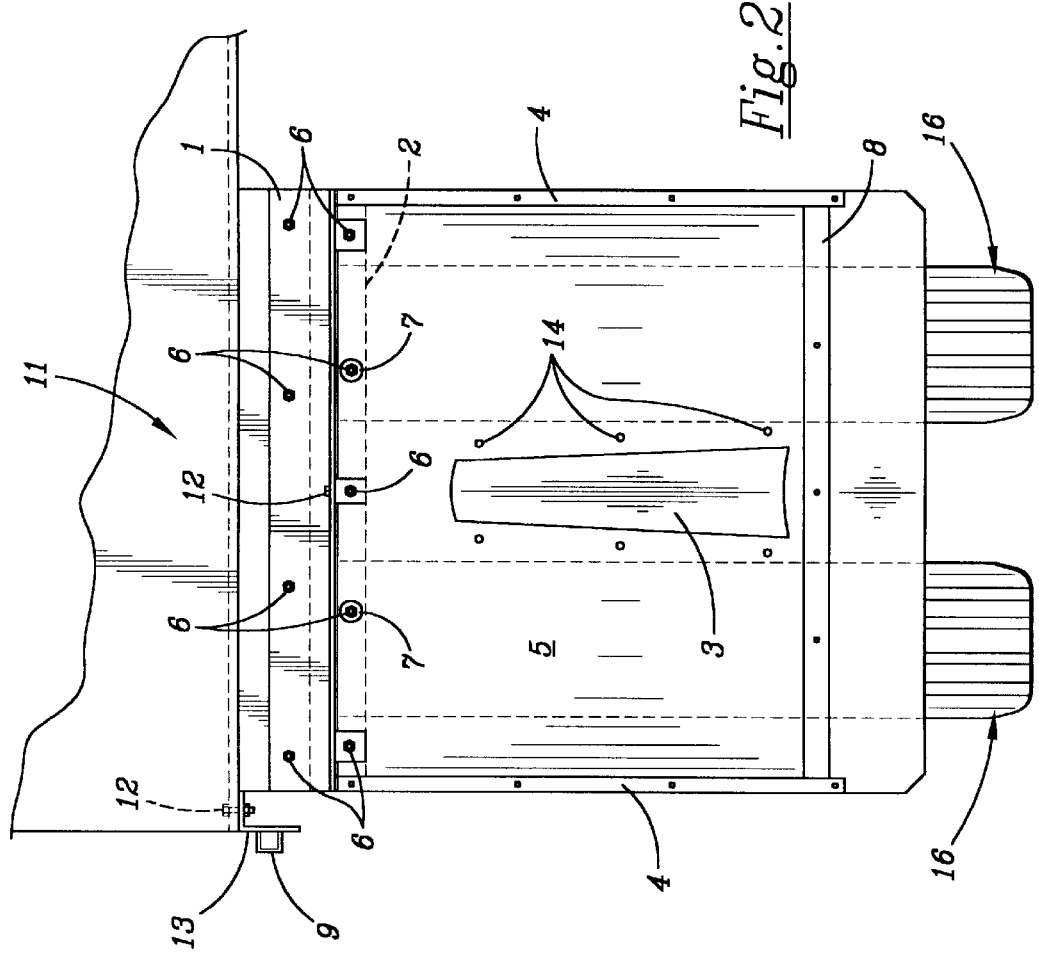

TRUCK SPRAY CONTROL SYSTEM

CROSS REFERENCE TO RELATED APPLICATIONS

This application is a continuation-in-part of U.S. patent application Ser. No. 09/351,358 filed on Jul. 12, 1999 now abandoned, which claims priority from provisional application Ser. No. 60/101,437 filed on Sep. 21, 1998.

BACKGROUND OF THE INVENTION

1. Field of the Invention

This invention relates generally to splash deflector shields or spray control systems for moving vehicles, and more particularly relates to a system utilizing a combination of forced air louvered panels and mudguards to decrease the amount of spray or splash caused by the motion of the vehicle.

2. Description of the Related Art

A recognized hazard exists when large or heavy road vehicles such as trucks and semi trailers, travelling at today's higher speeds, encounter inclement weather conditions such as rain or snow. The high rate of speed of rotation of the wheels creates a spray of water, which also is often mixed with small stones or other debris, along side and behind such vehicles. When this spray hits the windshield of vehicles such as passenger cars travelling behind such truck or semi-trailer, the visibility of the driver of such trailing vehicle can be significantly reduced, thereby causing extremely dangerous driving conditions. There is not likely any driver who has not experienced the almost total loss of vision when travelling behind, along side of, or when passed by semi trailers during inclement weather. This causes many drivers to lose control of their vehicles and to try many different maneuvers to avoid serious accidents. In view of this clear and present dangerous condition, a need exists for a method and apparatus that can drastically reduce the water spray and splash generated behind large road vehicles and thus increase the safety of all that travel our roads.

Numerous systems for reducing the amount of spray created by the wheels of a road vehicle are known in the prior art.

U.S. Pat. No. 4,334,694 issued to A. T. Iwanicki on Jun. 15, 1982, entitled "Splash Protection Assembly for Vehicles Equipped with Mudguards," discloses a mudguard having a means for guiding water between the wheel and mudguard to direct air and water flow to the road surface.

U.S. Pat. No. 4,436,319 issued to J. E. Clutter on Mar. 13, 1984, entitled "Vehicle Wheel Splash Guard," discloses a guard which covers a major portion of the top, front and rear sides of a tire well. Located on the front portion of the Clutter mudguard is an air intake aperture. However, such inlet does not act as an exit for air and water, and instead provides "a flow of air to the tire and brakes to prevent overheating." U.S. Pat. No. 4,585,242 issued on Apr. 29, 1986 to D. L. Sparks, entitled "Forced Air Rain Diverter," discloses a device for directing rain, mist, and water being brought up by wheel motions downward forcefully to the road surface. The louvered side panels of the present invention are significantly different from those illustrated in Sparks since Sparks contains vanes spaced along the interior of such diverter so that only a downward airflow is created. Applicant's side panels, however, do not contain such interior vanes, so that the airflow directs water or spray rearwardly as well as downwardly, so that the water or spray can pass through the vane opening in the mudguard to the road below, where it is dissipated. U.S. Pat. No. 4,858,941 issued to J. H. Becker on Aug. 22, 1989, entitled "Tire Spray Control Device," discloses a forward plate for directing water rearwardly and inwardly, and a trailing plate having baffles to direct spray inwardly.

U.S. Pat. No. 4,660,846 issued to A. Z. Morin on Apr. 28, 1987, entitled "Spray Shield for Automotive Vehicles," discloses a spray shield having a plurality of contiguous adjustable flaps, similar to a venetian blind, and which deflects water spray downwardly and in a lateral direction. Such shield is not angled as in the present invention, and therefore spray can also deflect around the sides of the shield.

U.S. Pat. No. 4,921,276 issued to A. Z. Morin on May 1, 1990, entitled "Spray Controlling Fender," discloses a fender and mudguard having horizontal louvers thereon. Such mudguard is not angled, however, and still allows a significant amount of water or spray to escape around the side edges of the device. U.S. Pat. No. 5,366,247 issued to K. J. Fischer on Nov. 22, 1994, entitled "Vehicle Splashguard," and U.S. Pat. No. 5,564,750 issued to J. E. Bajorek et al. on Oct. 15, 1996, entitled "Energy Saving and Heat Venting Vehicle Mud Flap," discloses related mudguards.

U.S. Pat. No. 5,100,177 issued to J. H. Becker on Mar. 31, 1992, entitled "Tire Spray Control Device," discloses a fender having a fender designed to control water spray, including a plurality of air scoops and louvers. Such control system is quite bulky, however, and covers both the front and trailing portions of the wheels. See also U.S. Pat. No. 5,460,411 also issued to J. H. Becker on Oct. 24, 1995, entitled "Fender for Cooling Tires and Brakes and to Control Spray."

U.S. Pat. No. 5,509,690 issued to F. L. Whittington on Apr. 23, 1996, entitled "Side Spray Safety Apparatus," discloses a mudguard for a ground vehicle having a stiffening device along the outside edge of such mudguard. The Whittington mud guard, however, is specifically designed so that the outer edge cannot flex or bend in the wind, while, on the other hand, the inner edge is allowed to flex or bend, so that the spray is directed toward the inner edge of such mud guard. Applicant's mudguard is different in that it is held rigid preferably by supports on each side of the mudguard to prevent bending or flapping in the wind, and, in addition, is inwardly angled to a central aperture so that air and water is channeled towards such central aperture.

None of such references discloses a spray control system similar to the present invention, which provides a combination of louvered side panels and a mudguard having an opening or well in the center of such guard through which rain and spray is directed, thereby virtually eliminating spray created by the rotation of the wheels, and creating a much safer driving condition.

SUMMARY

In accordance with one aspect of the invention, the inventor has provided louvered side panels which are mounted along the undercarriage or wheel well of a vehicle. The purpose of the louvered side panels is to create a downward air flow that directs or forces rain, mist, vapor and other similar substances toward the rear of the vehicle. The louvers of said panels catch air when the vehicle is in forward motion, which air forces rain water inward and towards the rear of the vehicle, where turbulence between the air and water prevents the spray from being discharged transversely and outwardly from the direction of travel of the vehicle and into the path of other vehicles. In addition, the inventor has provided a novel mudguard structure which is positioned behind the rear tires of the vehicle. Turbulence is created between the rear tires and mudguard, which turbulence is converted into a flow of air which forces rain, mist, tiny pebbles, etc. through a longitudinal cut-out or opening in the center of the mudguard, which opening has a cone-shaped cover secured to its outer surface so that a downwardly facing opening is formed between the mudguard and cover. This turbulence around the wheel is converted into a directional air flow caused by wind forcing water through the louvers of the invention and being drawn by the resulting vacuum or suction created by the cone-shaped opening in the center of the mudguard. Such action can be visualized as similar to the back and front door of a house being opened at the same time, wherein the wind rushing in will cause one of the doors to slam shut due to the turbulent cross current created. The louvers and cone-shaped opening in the mudguard as represented can be thought of as these two doors.

As indicated above, another major aspect of the invention, is the provision of a mudguard device having a centrally located cut out or opening and further having a cone-shaped cover secured over the outer surface of such opening so that a downwardly facing orifice or slot is formed between the mudguard and cover through which rain, spray, water, etc. will be directed downward to the road surface. Another aspect of the mudguard of the invention is the curvature of the sheet metal support bolted to the angle bar mounted on the trailer. Such curved member supports the mudguard and helps maintain its vertical orientation while the vehicle is in use, even at today's high speeds. The mudguard of the present invention differs from all mudguards in use today which are flat in nature, made of various rubber or polymeric material, and will flap in the wind current generated by forward movement of the vehicle. Such constant flapping makes the mudguards very ineffective and causes extreme wear and tear, making replacement unavoidable. In contrast, the presently disclosed mudguards will it is believed last for the lifetime of the vehicle on which they are installed. The mudguard is also angled inwardly toward its central well or opening so that water hitting the mudguard cannot escape around the sides of the guard, but rather is directed through such opening and is expelled to the road surface where it is dissipated. The preferred angle of inclination of the mudguard is approximately 27 degrees, although a range of suitable angles may be used.

According to another aspect of the invention, the opening in the center of the mudguard creates a flow of air that acts like a vacuum and draws or forces rain, spray, mist, and small pebbles toward the road surface and not into the path of vehicles driving behind the trailer. The pebbles being thrown up by tires are forced downwardly through the cone-shaped opening thereby preventing damage to windshields of vehicles riding behind trailers.

It is this combination of louvered side panels and mudguards with opening at center, which effectively reduce splash and spray during inclement weather. This reduction is also of paramount importance to trailer drivers since they now have clearer vision when trying to pass other vehicles during inclement weather. In addition, the mounting of louvered side panels on the underside of a trailer maintains the eight foot trailer width required by law.

BRIEF DESCRIPTION OF DRAWINGS

FIG. 2 is a rear view of one of the louvered side panels and mudguard of the invention.

FIG. 3 is an enlarged view of one of the side panels shown in FIG. 2.

DETAILED DESCRIPTION OF THE INVENTION

Figure 1:
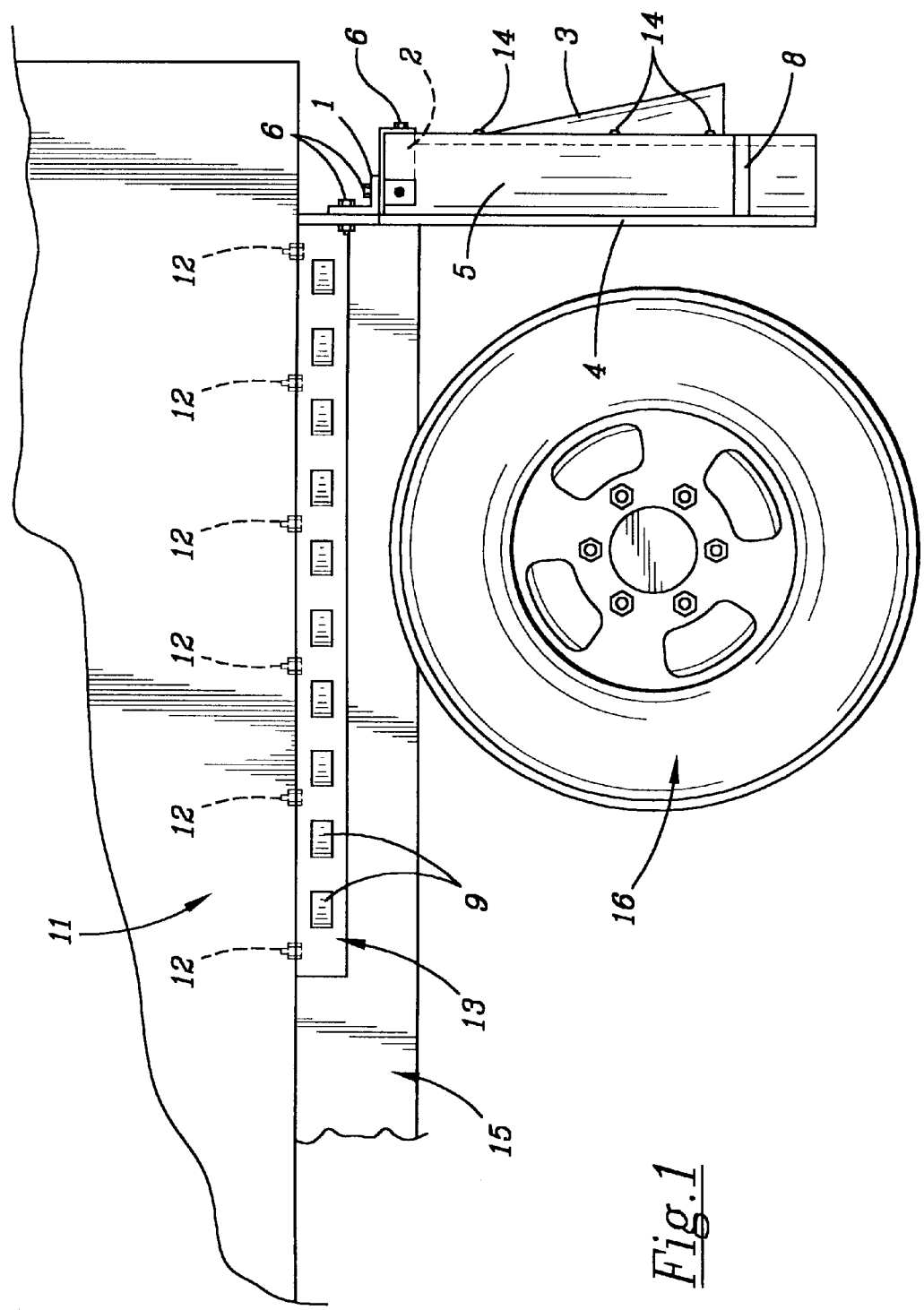
FIG. 1 is a side elevation view of the wheel portion of a road vehicle having the truck spray control system of the invention attached thereto.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings, one skilled in the art may be advised of the advantages and construction of the invention.

The present invention differs radically from all previous road vehicle spray control systems known to the inventor. One important difference between the present system and prior art systems is the downwardly opening window in the center of the mudguard or flap, which traps rain water, mist, and the like and directs such rain water and mist to fall to the pavement where it is dissipated. Another significant difference between the present system and prior art systems is that the mudguard is inwardly curved or angled, which feature aids in propelling rain water and mist towards the window and prevents such water from exiting around the sides of the guard. Another improvement is that the mud guard is held in a rigid configuration to prevent flapping in the wind, which would decrease its effectiveness. The louvered side panels mounted along the underside of the trailer structure catch the air flow generated by movement of the vehicle and direct it generally downwardly. This redirected air flow forces the water spray generated by rotation of the tires to gather into large water drops, and in addition prevents it from creating a dangerous spray. Such air flow then forces the water droplets and spray to flow towards the mud flaps and the window or orifice therein. The combination of mud flaps and louvered side panels eliminates almost 100% of the spray from trucks and trailers, significantly increasing the visibility of trailing drivers following behind vehicles with the invention installed and overall increasing the safety of driving conditions.

The mud flap itself consists of five parts to be assembled. The first part is an angle bar, which is mounted to the underside of a vehicle such as a trailer. The second part is a curved bar support which is mounted to the mud flap or guard, and then on the angle bar, on the underside of trailer. The third part is the cone-shaped window cover, attached about or over a hole in the center of the mud flap. The fourth part is a curved bar that is mounted along bottom of the mud flap. The fifth is the mud flap itself, which is made preferably from durable rubberized material capable of withstanding abuse and wear and having layers of undercoat protection. Metal side channel supports mounted on both sides of the mudguard may be optionally provided to increase the rigidity of the mudguard. The side panels are constructed of sheet metal with a series of rectangular openings, over which louvers are fitted. The side panels are then attached to the under side of a trailer. In use, such combination of mud flaps and louvered side panels achieves an almost 100% reduction of dangerous spray from trucks and trailers in rainy weather.

Figure 4:
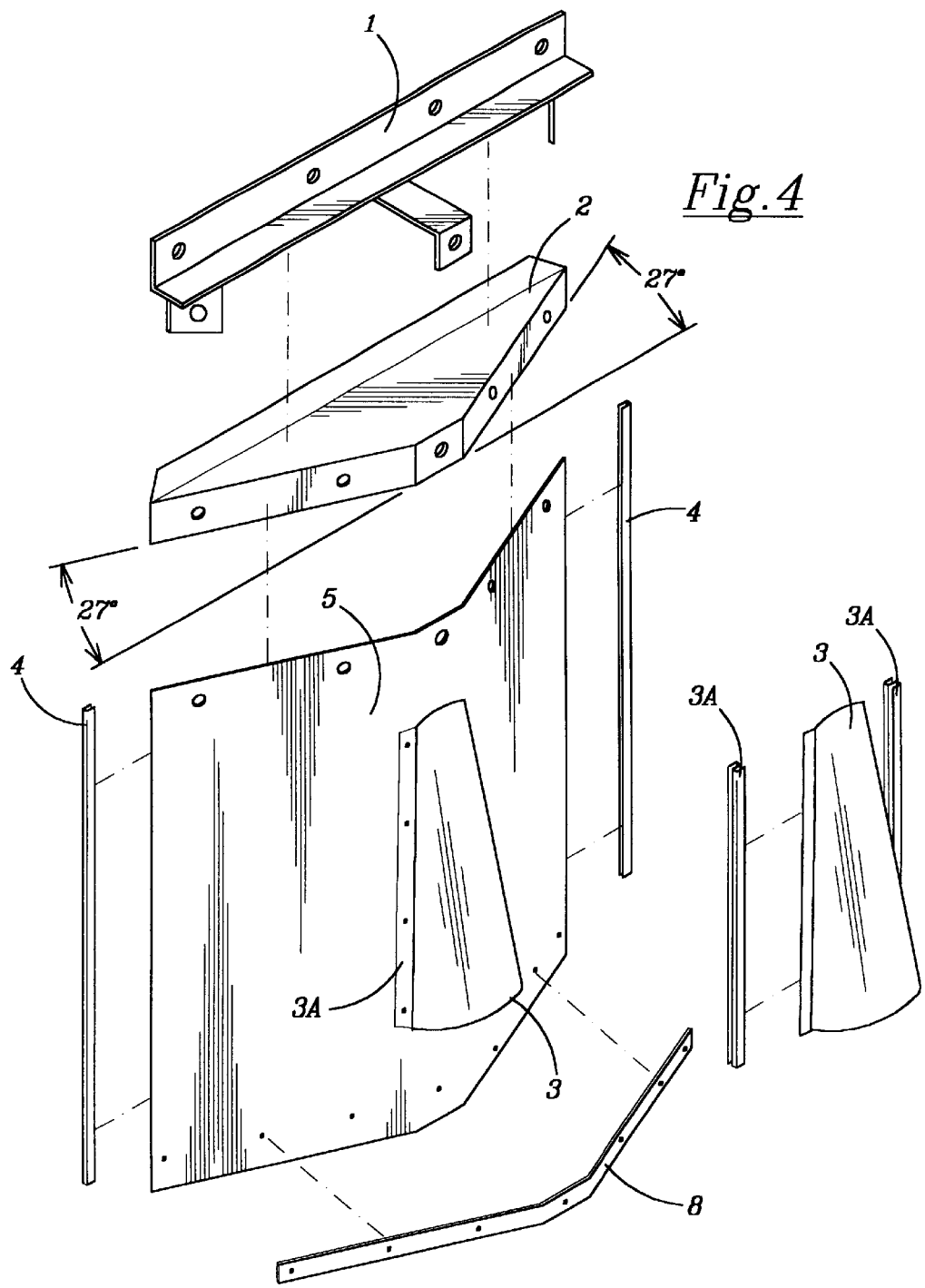
FIG. 4 is an exploded isometric view of the mudguard of the invention.
Figure 5:
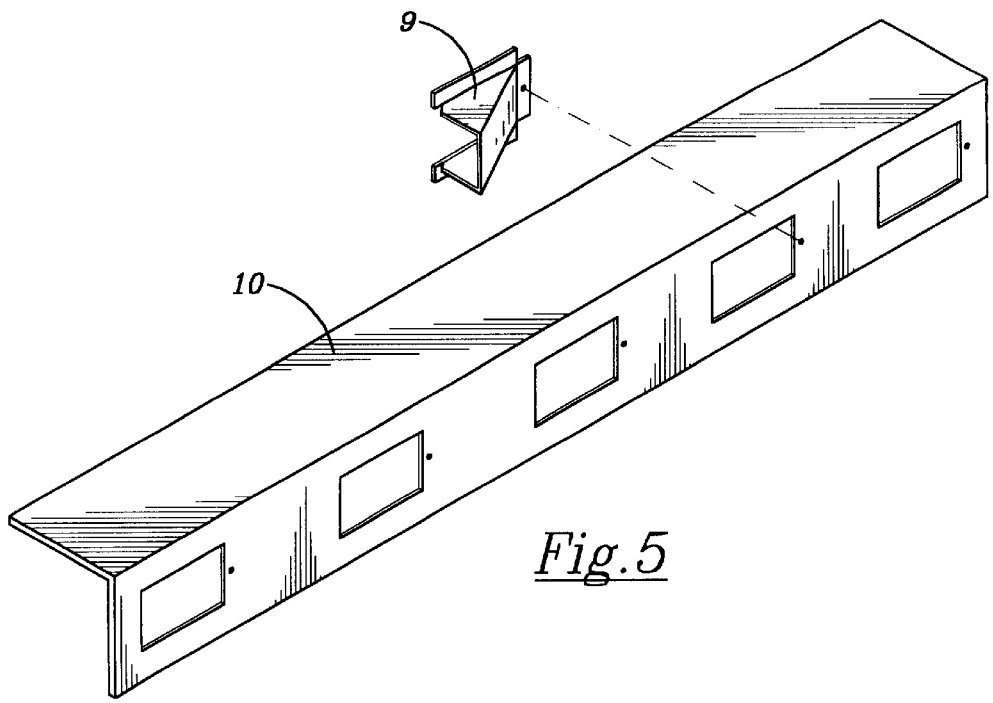
FIG. 5 is an isometric view of one of the side panels without the louvers attached.
Figure 6:
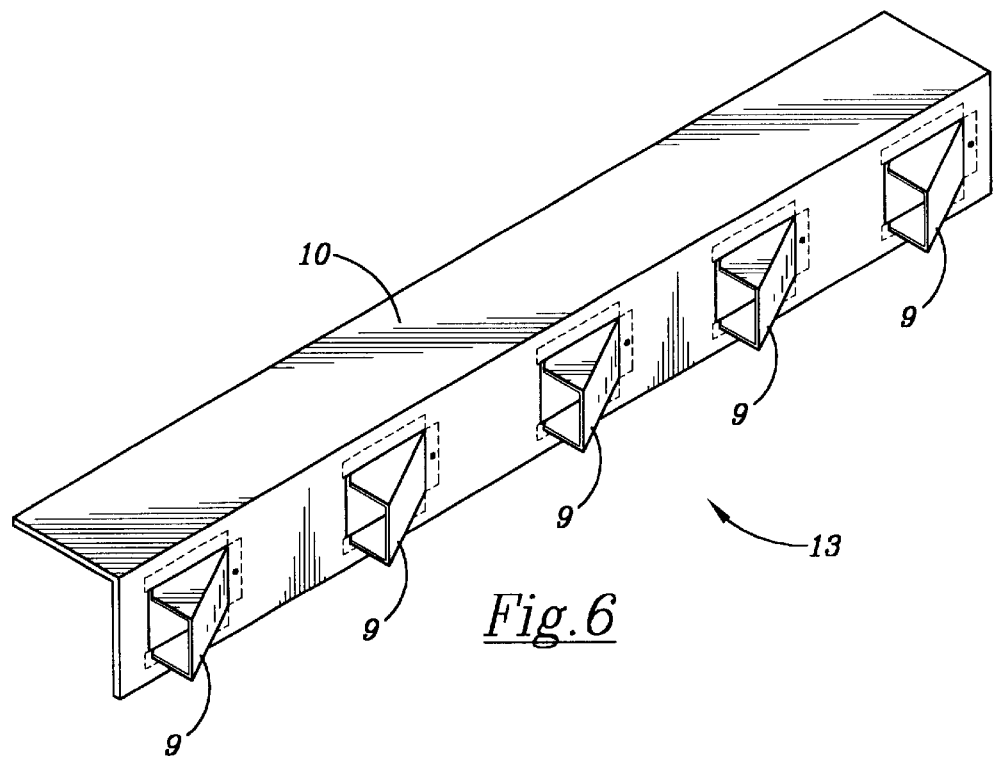
FIG. 6 is an isometric view of one of the side panels as shown in FIG. 5 with the louvers attached.

FIGS. 1–7 illustrate the spray control system of the invention. FIG. 1 is a side view of the undercarriage portion of a road vehicle 11 illustrating the mounting positions of the two main components of such spray control system, mudguard 5 and the louvered side panel, generally designated as 13. As best shown in FIGS. 1 3 and 5–6 louvered side panel 13 is comprised of L-shaped side panel 10, one leg of which is secured preferably to the underside 15 of the vehicle 11 by cadmium coated bolts 12, although such panel could also be bolted to the side of the vehicle, and with the other leg extending downwardly from the undercarriage 15. As shown in FIG. 5, spaced along the downwardly extending leg of side panel 10 are apertures through which air or spray can pass. Louvers 9 are then secured to the outside surface of such downwardly extending leg over the apertures, preferably by spot welding, forming a complete louvered side panel 13. See FIG. 6. Such louvers are situated so that they are opened generally facing the front of the vehicle so that air flow generated by movement of the vehicle or moisture is caught and channeled into such louvers. The louvers redirect such air flow creating generally downward and rearward flow of air which helps prevents water spray from rising along the side out of the wheel area of the vehicle, and in addition urges such water toward the mudguard where it is expelled as explained below.

Referring now to the mudguard, as best shown in FIGS. 1, 2, 4, and 7, in the preferred embodiment a first leg of L-shaped angle bar 1 is bolted to the undercarriage of vehicle 11 behind the rear wheels 16 by bolts 6. In the preferred embodiment, angle bar 1 is 2"×1 ½"×24" long. Angled support 2, made from sheet metal, is secured to the second leg of angle bar 1 by bolts 6, which are passed through the brackets connected to and extending from the undersurface of such second leg. In the preferred embodiment, support 2 is 24 inches wide, while bolts 6 are 5/16"×¾" and attached using 5/16" washers and nuts. As shown in FIG. 4, which is an exploded view of the mudguard assembly and its support system, mudguard 5 is bolted along with 2" diameter by 5/16" washers to the face of support 2, with such face being angled so that mudguard 5 is held at the same angle. Such inward angle in relation to tires 16 is necessary to the invention because it prevents spray from escaping out the sides of the mud flap or guard 5. Through experimentation, the inventor has determined that the mudguard as illustrated should optimally be angled at approximately 27 degrees, which angle allows water to easily flow through the well or opening in the mudguard without allowing water or spray to escape around the edges of the guard. However, a range of angles can be used with the invention, ranging from approximately 10–15 degrees up to approximately 45 degrees. For example, the inventor has also determined that an angle of 15 degrees is almost as effective. Of course, the exact dimensions of the mudguard 5 will be changed depending upon the desired angle.

Figure 7:
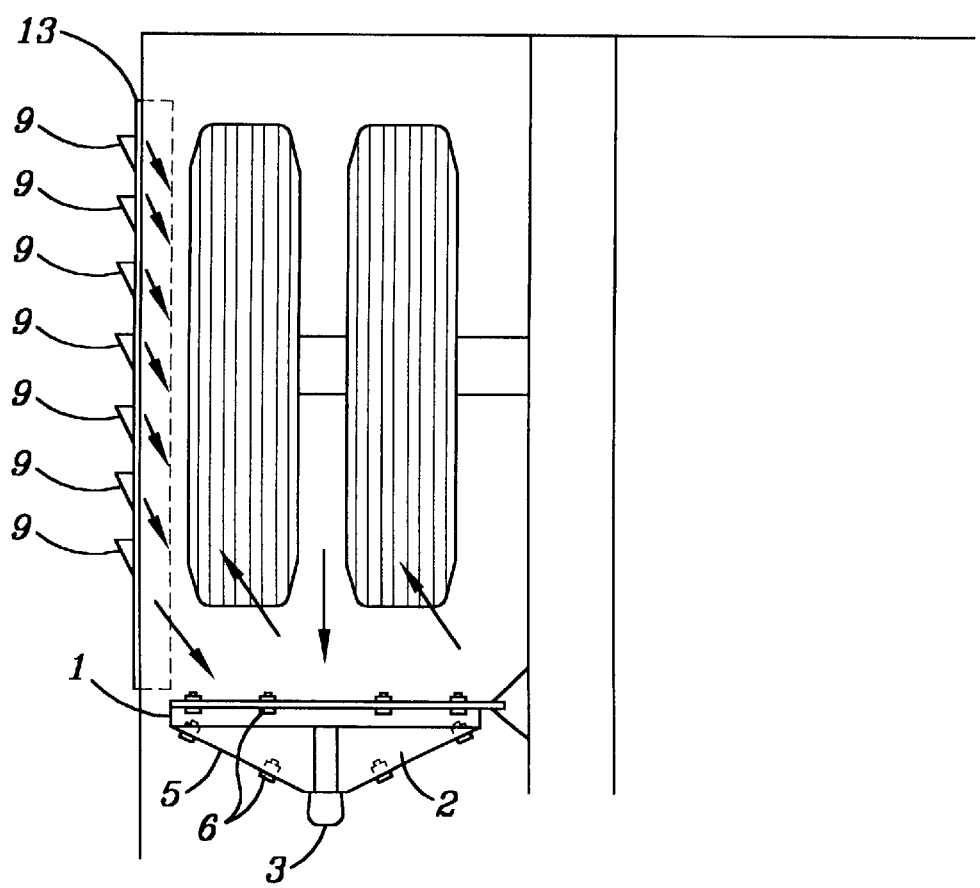
FIG. 7 is a top view of the truck spray control system of the invention secured to the undercarriage of a vehicle and with arrows indicating the direction of flow of water or spray.

Mudguard 5 is preferably made from a durable rubberized material that is capable of withstanding abuse or wear, and should have layers of undercoat protection. Referring still to FIGS. 1 and 7, metal side support channels 4 are preferably further secured to the sides of mudguard 5 by rivets, while 1.8"×¾" flat bar 8 is secured to the bottom of mudguard 5 by rivets 14. Bars 4 and 8 keep mudguard 5 at the same curvature throughout its entire length, and furthermore prevent it from bending in the high winds to which it is subjected when the vehicle is moving at a high rate of speed. Centrally located in mudguard 5 is an elongated cutout or opening, not shown, through which water may be expelled. The size and shape of the opening is not critical so long as it is sufficient to establish a significant air flow therethrough. Cone shaped window or cover 3 is secured to the outer surface of mudguard 5 over such cutout or opening by bolts 14. In addition, metal support channels 3a are secured along the sides of mudguard 5 by rivets 14, which support channels aid in maintaining cover 3 in position on mudguard 5 as well as in maintaining the shape of such cover 3. Due to the shape of cover 3, a downwardly facing opening is formed between cover 3 and mudguard 5, through which water or spray can be expelled. Maintaining the mudguard 5 at the proper angle is critical to the operation of the invention, since if the mudguard is allowed to flap in the wind to any significant degree, this will hinder the flow of air and water through the opening in mudguard 5.

In use, when the vehicle 11 is moving at high speeds, normally a current of air flows between the wheels or between the wheels and tire well of a vehicle. Louvers 9 create a second current of air directed towards the cutout or opening in the mudguard and the cover 3. As shown by the arrows in FIG. 7, when moisture such as rain, snow or other moisture is encountered, the air flow generated by louvered panels 13 attached to the underside of the trailer aids in preventing such moisture from shooting to the sides, instead directing it generally inwardly and towards the rear of the vehicle. Such rain, spray, water, pebbles, etc. is then directed at mudguard 5, where the air flow through the downwardly facing opening formed by the cone-shaped cover 3 against the outer side of mudguard 5 forces the liquid and the like to also be funneled through the opening and downward to the road surface, where it is dispersed. Different sized openings in the mudguard may be used, although cover 3 should always be positioned so that the water is forced through the lower end of the opening to the pavement below.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. A vehicle spray control system comprising:
    (a) a mudguard attached to a vehicle having tires, the mudguard extending behind the tires of the vehicle, said mudguard being inwardly tapered towards the rear of the vehicle and having an orifice at a central location through which water spray caused by the rotation of the tires is funneled, said mudguard secured along its top surface to a mounting member that is inwardly tapered towards the rear of the vehicle, which mounting member is secured to an L-shaped angle bar secured to the vehicle;
    (b) deflector means beyond the central orifice to deflect water spray downwardly; and
    (c) a means for urging or deflecting air and moisture downwardly and rearwardly towards said mudguard.

2. A vehicle spray control system in accordance with claim 1 wherein said means for urging or deflecting air and moisture downwardly and rearwardly toward said mudguard is forced air louvered panel comprised of an L-shaped bracket having a first leg secured to the vehicle and a second leg extending downwardly from the vehicle, said downwardly extending second leg having orifices over which louvers are secured, said louvers being opened towards the front of the vehicle.

3. A vehicle spray control system in accordance with claim 2 wherein the deflector means comprises a curved deflection member secured partially over the orifice in the mudguard such that air and water is forced downwardly toward the road surface where it is dispersed.

4. A vehicle spray control system in accordance with claim 1 wherein the angle of curvature of the mudguard is within a range from approximately ten degrees to forty-five degrees.

5. A vehicle spray control system in accordance with claim 4 wherein the angle of curvature of the mudguard is approximately twenty-seven degrees.

6. A vehicle spray control system in accordance with claim 1 wherein stiffening members are secured around the periphery of the mudguard to prevent the mudguard from flapping or bending.

7. A mist and water spray deflector arrangement for use behind the tires of a heavy vehicle comprising:
   (a) a mounting member having a low angular triangular configuration with the apex of the triangle oriented to the rear of the vehicle,
   (b) an at least somewhat flexible mudguard member mounted at the top upon the low angular mounting member,
   (c) said mudguard member assuming at the top the configuration of the mounting member,
   (d) a curved stiffening member secured at the bottom of the mudguard member having the configuration of the mounting member,
   (e) an orifice in the rearwardly extended center of the mudguard member, and
   (f) a semiconical deflector over the orifice in the mudguard member, said deflector arranged so that a downwardly open space between the mudguard and deflector is provided to allow air and moisture to pass through said space and directing said air and moisture downwardly toward a road surface.

8. A mud and water spray deflector arrangement in accordance with claim 7 additionally comprising stiffening members secured on the sides of the mudguard.

9. A mud and water spray deflector arrangement in accordance with claim 7 additionally comprising stiffening members at the intersections of the sides of the semiconical deflector with the mudguard member on either side of the orifice in the mudguard member.

10. A mud and water spray deflector arrangement in accordance with claim 7 additionally comprising forced air louvered panels connected to the vehicle, said louvered panels provided to urge or deflect air and moisture downwardly and rearwardly toward said mudguard member, said louvers being opened towards the front of the vehicle.

11. A mud and water spray deflector arrangement in accordance with claim 10 wherein said forced air louvered panels are comprised of an L-shaped bracket having a first leg secured to the vehicle and a second leg extending downwardly from the vehicle, said downwardly extending second leg having orifices over which louvers are secured.

* * * * *